United States Patent
Hardee et al.

(10) Patent No.: US 10,705,618 B2
(45) Date of Patent: *Jul. 7, 2020

(54) TACTILE GRAPHICAL DISPLAY

(71) Applicant: International Business Machines Corporation, Armonk, NY (US)

(72) Inventors: Christopher J. Hardee, Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,075

(22) Filed: Jul. 3, 2019

(65) Prior Publication Data
US 2019/0324547 A1 Oct. 24, 2019

Related U.S. Application Data

(63) Continuation of application No. 14/830,120, filed on Aug. 19, 2015.

(51) Int. Cl.
*G06F 3/01* (2006.01)
*G06F 3/0483* (2013.01)
*G06F 3/041* (2006.01)

(52) U.S. Cl.
CPC .......... *G06F 3/016* (2013.01); *G06F 3/041* (2013.01); *G06F 3/0483* (2013.01); *G06F 2203/04102* (2013.01)

(58) Field of Classification Search
None
See application file for complete search history.

(56) References Cited

U.S. PATENT DOCUMENTS

| | | | |
|---|---|---|---|
| 8,451,238 | B2 | 5/2013 | Kim et al. |
| 9,690,383 | B1 | 6/2017 | Robert et al. |
| 2011/0287393 | A1 | 11/2011 | Rebolledo-Mendez |
| 2012/0286944 | A1 | 11/2012 | Forutanpour et al. |
| 2013/0093660 | A1 | 4/2013 | Hirsch et al. |
| 2013/0120302 | A1* | 5/2013 | Kang ............... G06F 3/041 345/173 |

(Continued)

FOREIGN PATENT DOCUMENTS

EP 2778856 A1 9/2014

OTHER PUBLICATIONS

Campbell, "Apple wins design patents for page turning animation and iPad Smart Case", appleinsider, Tuesday, Nov. 13, 2012, 02:44 am PT. Last printed Jun. 12, 2015, 3:58 pm CST. 9 pages. http://appleinsider.com/articles/12/11/13/apple-wins-design-patents-for-page-turning-animation-and-ipad-smart-case.

(Continued)

*Primary Examiner* — Andre L Matthews
(74) *Attorney, Agent, or Firm* — Stosch Sabo

(57) ABSTRACT

A method, system, and computer program product for generating a visual and tactile representation of a plurality of flexed pages associated with a set of data and presented on a graphical display. The graphical display may sense a plurality of flexural states and model respective tactile gradients according to the plurality of flexural states. For a flexural state meeting a set of criteria, the tactile gradient may be applied to the graphical display by distributing a selective volume contained with the graphical display.

20 Claims, 7 Drawing Sheets

(56) References Cited

U.S. PATENT DOCUMENTS

| | | | |
|---|---|---|---|
| 2013/0222416 A1 | 8/2013 | Kim et al. | |
| 2013/0268847 A1* | 10/2013 | Kim | G06F 3/0488 715/251 |
| 2014/0173495 A1 | 6/2014 | Chang et al. | |
| 2014/0192247 A1* | 7/2014 | Cheong | G06F 3/011 348/333.11 |
| 2017/0052591 A1* | 2/2017 | Hardee | G06F 3/0483 |

OTHER PUBLICATIONS

Johnston, "Microfluidics panel could add physical buttons to a touch screen", Gear & Gadgets / Product News & Reviews. Jan. 23, 2014. 1:30 pm CST. Last printed Jun. 12, 2015, 4:04 pm CST. 2 pages. http://arstechnica.com/gadgets/2014/01/new-microfluidics-panel-could-add-physical-buttons-to-a-touch-screen/.

Macari, "Apple gets design patent on virtual page turning, but doesn't own the page turn", The Verge, Nov. 19, 2012, 2:42 am. Last printed Jun. 12, 2015, 3:59 pm CST. 4 pages. http://www.theverge.com/2012/11/19/3659382/apple-design-patent-on-virtual-page-turn.

Purcher, "Is Samsung Really Trying to Patent a Shadow Effect for eBooks?" Patently Apple, Apr. 29, 2013, 7:09 pm. Last printed Jun. 12, 2015, 3:56 pm CST. 4 pages. http://www.patentlyapple.com/patently-apple/2013/04/is-samsung-really-trying-to-patent-a-shadow-effect-for-ebooks.html.

Unknown, "A touchscreen with keys that rise and disappear", CNN, updated Jun. 6, 2012, 11:10 am ET. Last printed Jun. 12, 2015, 4:03 pm CST. 4 pages. http://www.cnn.com/2012/06/06/tech/a-touchscreen-with-keys-that-rise-and-disappear/index.html.

Wikipedia, "Skeuomorph", From Wikipedia, the free encyclopedia. Last printed Jun. 12, 2015, 4:00 pm CST. 5 pages. https//en.wikipedia.org/wiki/Skeuomorph.

IBM, List of IBM Patents or Patent Applications Treated as Related, Jul. 2, 2019, 2 pages.

\* cited by examiner

TACTILE GRAPHICAL DISPLAY

BACKGROUND

The present disclosure relates to graphical displays, and more specifically, to tactile graphical displays.

Graphical displays convey information to a user via an electronic medium. One type of graphical display is an e-book reader. Some e-book readers imitate various physical aspects of books to enhance the user's experience.

SUMMARY

Aspects of the present disclosure may include a method for visually and tactilely presenting at least a portion of a document having a plurality of pages on a graphical display. The method may include monitoring a flexural state of a graphical display presenting a current page of a document. The method may include sensing a change from a first flexural state to a second flexural state of the graphical display. The method may include determining the change from the first flexural state to the second flexural state is above a first threshold. The method may include defining a tactile gradient having a plurality of surfaces representing at least a portion of the plurality of pages of the document, where each surface comprises a discrete plane with respect to each other surface. The method may include applying the tactile gradient to the graphical display by distributing a selective volume within a portion of the graphical display.

Aspects of the present disclosure may include a system for presenting a tactile gradient on a graphical display having a plurality of flexural states. The tactile gradient may represent at least a portion of a document having a plurality of pages. The system may comprise a memory configured to store the document, a graphical display configured to present a current page of the document, a microfluidics panel configured to present the tactile gradient, at least one sensor configured to measure a change between a first flexural state of the graphical display and a second flexural state of the graphical display, and a processor. The processor may be configured to receive, from the sensor, the change between the first flexural state and the second flexural state. The processor may be further configured to determine the change between the first flexural state and the second flexural state is above a first threshold. The processor may be further configured to model the tactile gradient, where the tactile gradient comprises a plurality of discrete surfaces representing at least a portion of the plurality of pages of the document. The processor may be further configured to provide instructions to the microfluidics panel to apply the tactile gradient.

Aspects of the present disclosure may include a computer program product for creating a tactile representation of at least a portion of a document presented on a graphical display. The computer program product may comprise a computer readable storage medium containing program instructions which are executable by a processor. The program instructions may cause the processor to monitor a first curvature of a graphical display presenting a current page of a document having a plurality of pages. The program instructions may further cause the processor to quantify a change from the first curvature to a second curvature of the graphical display. The program instructions may further cause the processor to determine the change from the first curvature to the second curvature is above a first threshold. The program instructions may further cause the processor to model, in response to determining the change from the first curvature to the second curvature is above a first threshold, a tactile gradient comprising a plurality of discrete surfaces, where each surface contains a respective geometry, and where no two surfaces of the plurality of surfaces are coplanar. The program instructions may further cause the processor to provide instructions to the graphical display to apply the tactile gradient by distributing a selective volume contained within a portion of the graphical display.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 3A presents a top-view of an illustrative tactile gradient according to some embodiments of the present disclosure.

FIG. 3B presents a side-view of the illustrative tactile gradient of FIG. 3A according to some embodiments of the present disclosure.

Figure 1A:
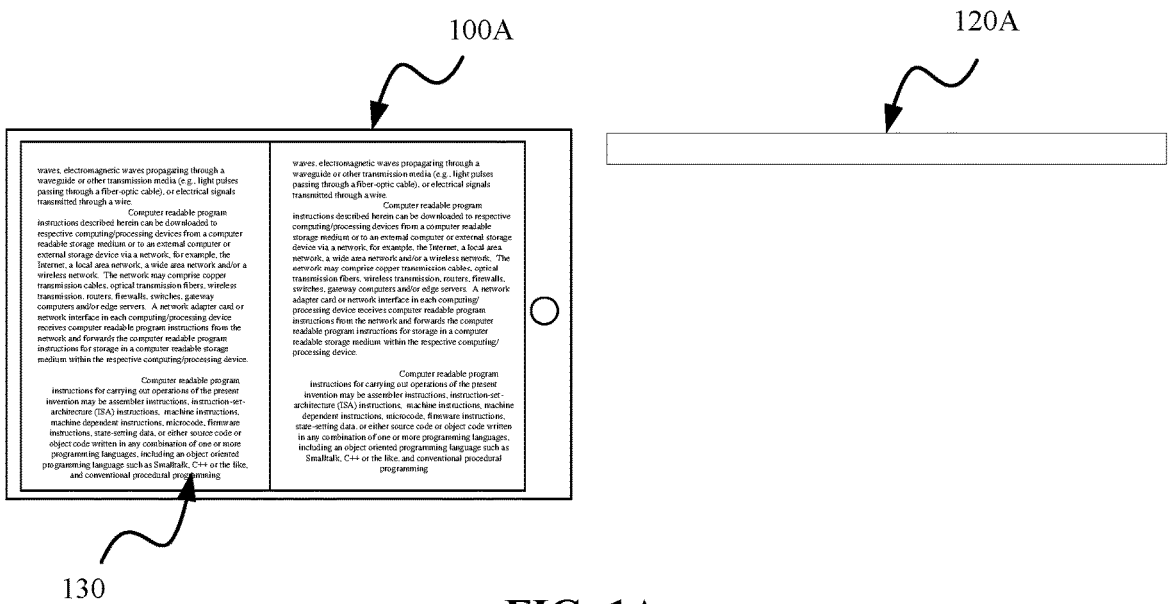
FIG. 1A is a top view and a front view of a graphical display in an unflexed state according to some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Graphical displays, such as an e-book reader, convey information to a user via an electronic medium. Some embodiments of the present disclosure relate to improvements of an e-book reader. Additional embodiments relate to flexible graphical displays for presenting the user with information such as books, web pages, photographic albums, or other types of documents.

Some embodiments of the present disclosure provide for a graphical display configured to produce a three-dimensional representation of the remaining number of pages in a given document. For the purposes of the present disclosure, a document should be construed to mean any set of data capable of being paginated (e.g., a book, web sites, internet search results, photo albums). In some embodiments, a user flexes an edge of the graphical display corresponding to an edge of the presented document which, sensing the flexion, generates a three-dimensional imitation of the remaining number of pages. For the purposes of this disclosure, a page of a document should be construed to mean any discrete portion of a data set capable of being presented individually. Thus, according to the variety of possible documents, a page could contain a set of text, one or more photographs, one or more videos, one or more hyperlinks, etc. The present disclosure advantageously provides both a visual and a tactile representation of a set of pages, including, in some embodiments, tactile and visual representations of bookmarks and other section markings (e.g., chapter markings, user marked sections, social media markings, etc.). Aspects of the present disclosure further provide skeuomorphic advantages, that is, the tactile graphical display mimics aspects of an actual book for aesthetic purposes.

It is to be understood that the aforementioned advantages do not list every advantage, and furthermore, various embodiments of the present disclosure include some or none of the advantages described herein while remaining within the spirit and scope of the present disclosure.

Aspects of the present disclosure can use microfluidic devices to generate a tactile representation of a set of pages. Specifically, aspects of the present disclosure provide for a series of protrusions and depressions forming a set of discrete surfaces on an otherwise substantially smooth surface. In various embodiments, the set of discrete surfaces is created via microfluidics. As is understood by one skilled in the art, microfluidics leverages micro-level material characteristics to selectively distribute small volumes of fluid to achieve controlled outcomes. In embodiments of the present disclosure, the controlled outcomes involve a change in the geometry of a portion of the graphical display. Some aspects of the present disclosure utilizing microfluidics employ any number of strategies known in the art to achieve the desired outcomes. Non-limiting examples of these strategies include exploiting material characteristics (e.g., non-Newtonian behavior, laminar flow, etc.), designing channels, valves, mixers, and pumps operating by, for example, mechanical, biological, chemical, electrical, diffusive, osmotic, pneumatic, hydraulic, or a combination of the aforementioned methods, fabricating microfluidic devices via, for example, photolithography, soft lithography, injection molding, laser etching, printing, or other means. As appreciated by one skilled in the art, microfluidics is a maturing scientific field and thus, modifications and improvements in the materials, design, fabrication, and application of microfluidic devices as employed in some embodiments of the present disclosure can be realized without departing from the spirit and scope of the present disclosure. Thus, microfluidics panel technology is sufficiently understood by one of skill in the art to not require more detailed discussion herein.

Furthermore, it should be understood that the term "microfluidics" is used for clarity, however, the application of microfluidic devices with respect to some aspects of the present disclosure should not be construed as limited to devices operating within a technically "micro" scale. Rather, the term microfluidics, as used for some embodiments in the present disclosure, should be construed to mean any mechanical, chemical, biological, electrical, hydraulic, or pneumatic method, or any combination of the aforementioned methods, able to successfully manipulate selective volumes on a sufficiently small scale to be embedded within, or otherwise operably coupled to, a graphical user interface presenting a tactile gradient in accordance with embodiments of the present disclosure.

As previously described, the present disclosure provides several advantages, both aesthetic (e.g., replicating the form of a flexed document) and practical (e.g., providing quick reference to the number of remaining pages), as a result of generating a tactile and visual representation of a set of pages on a graphical display. Thus, to further articulate some aspects of the present disclosure, it can be useful to describe various embodiments of the present disclosure with reference to a number of figures.

FIG. 1A presents a graphical display in an unflexed state according to some embodiments of the present disclosure. FIG. 1A illustrates both a top view 100A and a front view 120A of the graphical display according to various embodiments. Hereinafter, the graphical display can be referred to generally as graphical display 100 where the reference is irrespective of viewpoint or flexural state. The graphical display 100 is used to present data 130 (e.g., text, graphics, videos, etc.). According to various embodiments, the graphical display 100 is a tablet, an e-reader, a mobile phone, a monitor, or any other graphical display capable of presenting information to a user and capable of flexing in response to a user force. According to various embodiments, the graphical display 100 contains a microfluidics panel as will be further described hereinafter.

Figure 1B:
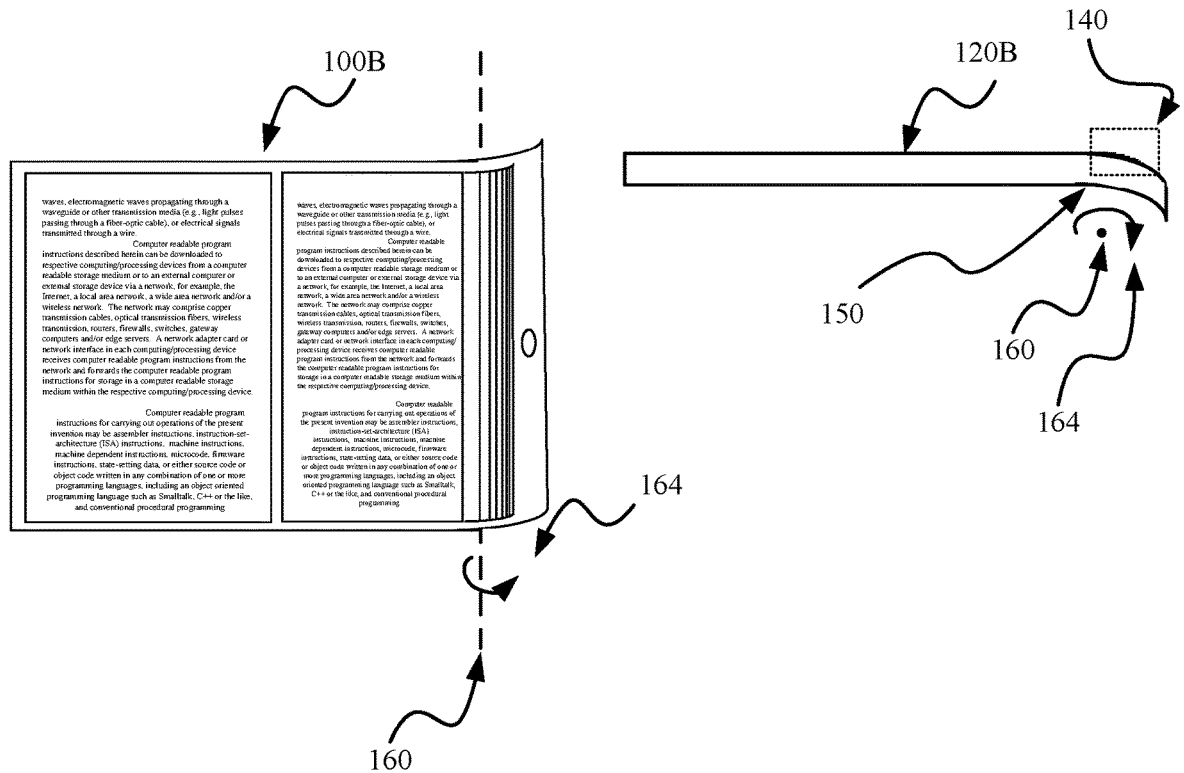
FIG. 1B is a top view and a front view of the same graphical display in a flexed state according to some embodiments of the present disclosure.

FIG. 1B presents the same graphical display in a flexed state. FIG. 1B shows both a top view 100B and a front view 120B of the graphical display according to various embodiments. The graphical display in a flexed state 100B is deformed by a rotational force 164 about an axis of rotation 160. When the graphical display is presented in the front view 120B, the same rotational force 164 and axis of rotation 160 demonstrate the creation of a curvature 150 of the graphical display. In response to the curvature 150, the microfluidics panel of the graphical display generates a tactile gradient 140 replicating the visual and tactile appearance of a set of flexed pages.

As shown in FIG. 1B, the curvature 150 is created by a rotational force 164 about an axis of rotation 160. According to alternative embodiments, the flexion occurs around axes having alternative orientations with respect to the presented data 130 or the graphical display 100 and being located different distances from a given location on the graphical display 100. For example, the top right corner of the top view 100B of the graphical display could be flexed. In such an instance, the axis of rotation can form an angle (e.g., approximately a 45 degree angle) with respect to the orientation of the data 130 or the graphical display 100. In the same example, the location of the axis of rotation can change. The location of the axis of rotation is related to the curvature 150 in some embodiments. Specifically, a curvature can be defined as the reciprocal of the distance to the axis of rotation (i.e., the reciprocal of the radius). Thus, a shorter distance results in a larger degree of curvature whereas a longer distance results in a smaller degree of curvature. In addition to representing the curvature, the distance of the axis of rotation to a point on the graphical display also provides information regarding the orientation of the flexion. In various embodiments, the curvature 150 is defined as a maximum curvature, an average curvature, or a curvature value coupled to a distance value where the distance represents the length of a curvature line orthogonal to the axis of rotation (i.e., the length of the arc comprising the curvature).

Regardless of the location of flexion, portions of the tactile gradient 140 are oriented substantially parallel to the axis of rotation. Specifically, edges of the tactile gradient representing pages or sets of pages are oriented substantially parallel to the axis of rotation. Thus, a planar cross-section of the tactile gradient 140 is substantially orthogonal to the axis of rotation.

In various embodiments, the curvature 150 can form a variety of geometries such as, but not limited to, cylindrical, spherical, ellipsoidal, conical, or combinations of the aforementioned geometries. Thus, according to the shape of the curvature, multiple axes, angles, distances, and curvatures can be calculated to sufficiently define the geometry of the curvature.

Although the present disclosure discusses an orientation of the axis of rotation with respect to the data 130 (i.e., data presented on the graphical display 100) and one or more distances of the axis of rotation with respect to one or more points on the graphical display 100, it should be appreciated that additional or alternative data can be collected regarding the flexion of the graphical display 100 in order to develop an appropriate tactile gradient 140. In some embodiments, the flexion is quantified using stress and strain data from aspects of the graphical display 100. In alternative embodiments, the flexion is quantified using varying distances between a plurality of sensors communicatively coupled to one another. Thus, regardless of the type of data collected regarding the flexural state of the graphical display 100, the data is used, in whole or in part, to determine the characteristics of the tactile gradient 140 in some embodiments of the present disclosure.

Figure 2:
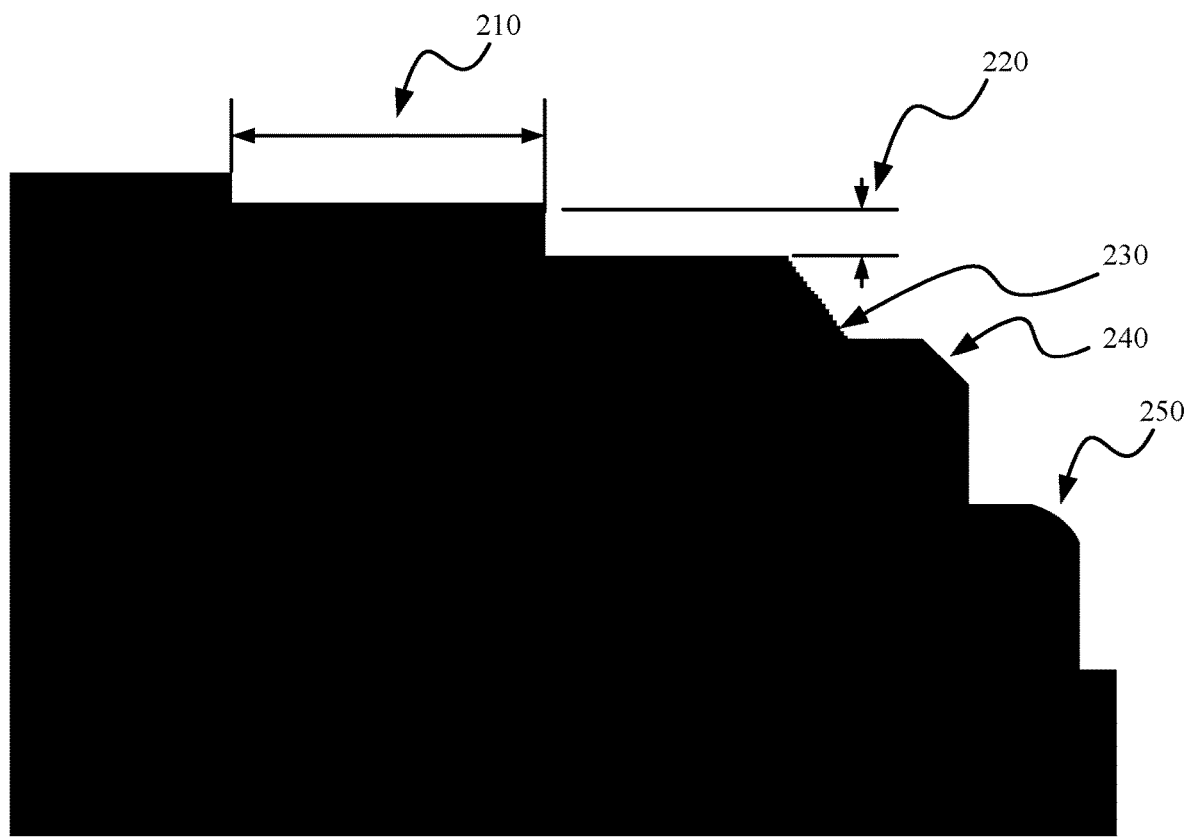
FIG. 2 depicts a portion of one example of a graphical display in a flexed state in accordance with embodiments of the present disclosure.
Figure 2:
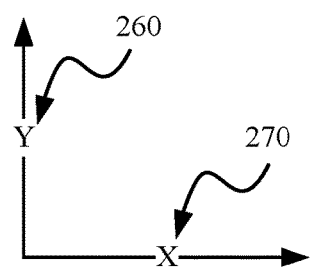

Referring now to FIG. 2, shown is an illustrative cross-section of a tactile gradient in accordance with embodiments of the present disclosure. In some embodiments, FIG. 2 is the same or substantially the same as the tactile gradient 140 of FIG. 1. The tactile gradient contains a plurality of variable lengths 210 parallel to an x-axis 270 and a plurality of variable heights 220 parallel to the y-axis 260. In this example, the x-axis 270 is parallel to the surface of the graphical display and a y-axis is perpendicular to the surface of the graphical display. A respective length 210 and height 220 adjacent to one another form a step. The tactile gradient is, therefore, composed of a plurality of steps. The lengths 210 and the heights 220 can vary in magnitude throughout the tactile gradient. Thus, the dimensions of individual steps can vary, and therefore, the relationships between steps can vary. In some embodiments, a length-to-height ratio of the steps forming the tactile gradient decreases as the distance from the axis of rotation (e.g., axis of rotation 160 of FIG. 1) increases. However, in some embodiments, outlying length-to-height ratios appear throughout the tactile gradient to generate a non-linear pattern. For example, replicating the page distribution of a book edge under flexion requires, in some cases, outlying length-to-height ratios for some steps to reproduce a book having, for example, inconsistent binding. Thus, numerous patterns and trends are contemplated in determining the length-to-height ratio of the portions of the tactile gradient corresponding to various pages or sets of pages. In various embodiments each step is associated with a page or a set of pages, and furthermore, variations in the height 220 can represent different numbers of pages.

In addition to the general variability of the lengths 210 and the heights 220, some embodiments alter the edges of the various steps. For example, the edge of various steps can contain a multitude of small steps 230 (e.g., a fractal representation of a set of steps connecting two surfaces), the edge can contain a slope 240 (e.g., a chamfer), or the edge can contain a radius 250. It should be understood that these are exemplary embodiments, and a multitude of edge geometries and patterns, both constant and variable, and combinations of the aforementioned, are within the spirit and scope of the present disclosure.

Thus, a length 210 represents a discrete surface of the tactile gradient. In some embodiments a discrete surface is separated from adjacent surfaces by at least a height 220. Although the lengths 210 are shown to be substantially parallel with one another, the lengths 210 can be non-parallel. Thus, an angle, in addition to a height 220, can be used to describe the relationships between various discrete surfaces. Regardless of the orientation of each surface, no two surfaces in the tactile gradient are coplanar. That is to say, parallel surfaces are separated by at least a non-zero distance, and non-parallel surfaces are separated by at least a non-zero angle.

Figure 3C:
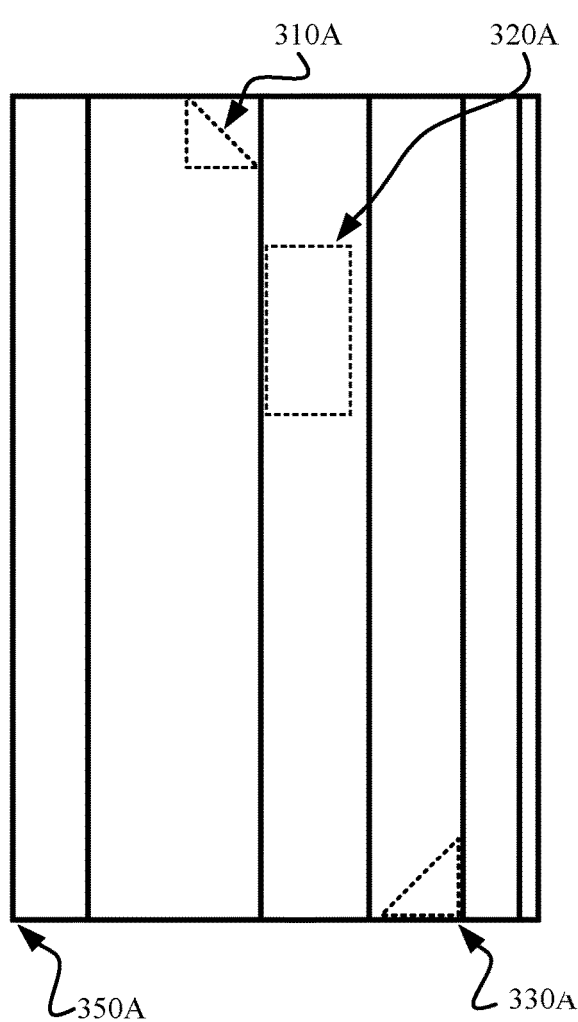
FIG. 3C presents a front-view of the illustrative tactile gradient of FIG. 3A according to some embodiments of the present disclosure.
Figure 3C:
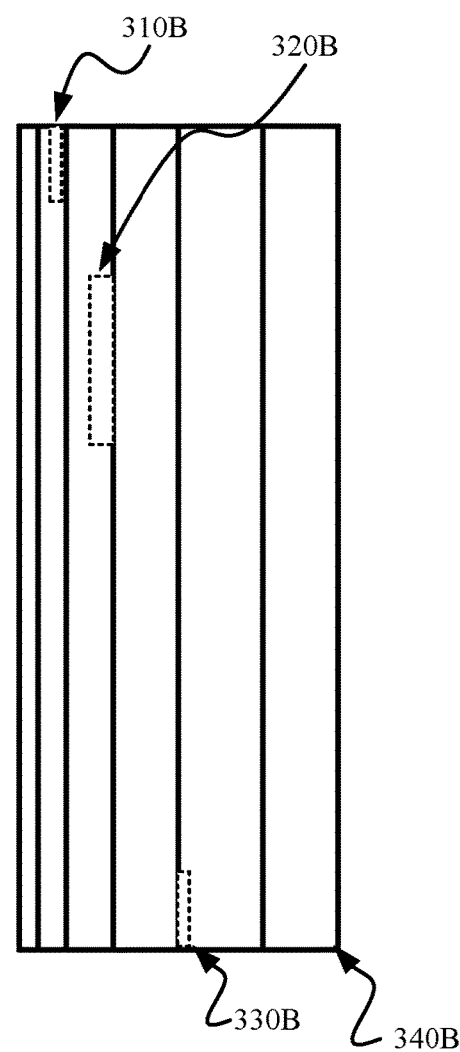
Figure 3C:
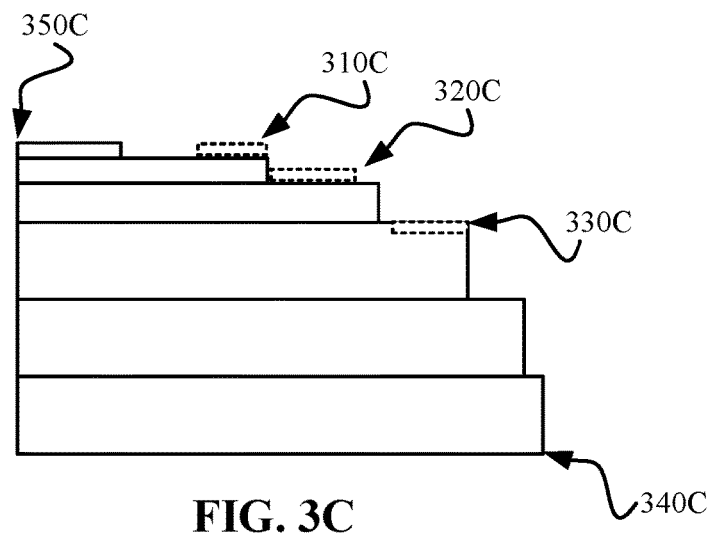

Referring now to FIG. 3, shown is a first-angle orthographic projection of a tactile gradient containing optional markings in accordance with embodiments of the present disclosure. FIG. 3A shows a top view of an illustrative tactile gradient. FIG. 3B shows a side view of the same illustrative tactile gradient. FIG. 3C shows a front view of the same illustrative tactile gradient. Specifically, corner 350A of FIG. 3A is the same corner as 350C of FIG. 3C. Likewise, corner 340B of FIG. 3B is the same corner as 340C of FIG. 3C.

In some embodiments, the tactile gradient contains markings (shown as optional via the dotted lines of FIG. 3) in the form of protrusions, depressions, or protrusions and depressions with respect to the surrounding surface. The two-dimensional or three-dimensional markings identify selective page numbers within the text according to some embodiments of the present disclosure. Numerous types of markings are contemplated in the present disclosure. As specific examples, some embodiments of the present disclosure generate triangular protrusions such as the one shown in 310A, 310B, and 310C of FIGS. 3A, 3B, and 3C respectively. Alternatively, triangular depressions as shown by 330A, 330B, and 330C of FIGS. 3A, 3B, and 3C, respectively, are also possible. Further, combinations of triangular protrusions and depressions are possible, where, for instance, the protrusion and depression replicates added and detracted thicknesses of a folded page corner with respect to an unfolded portion of a page. The triangular protrusions and depressions can be any class of right triangle in accordance with various embodiments. In cases using a combination of triangular protrusions and depressions, the protrusion and the depression can share a common edge where the common edge forms a line of symmetry between the protrusion and the depression.

In alternative embodiments, the markings comprise substantially rectangular geometries as shown in 320A, 320B, and 320C of FIGS. 3A, 3B, and 3C respectively. The rectangular geometries are alterable by, for example, changing lengths, widths, and corner radii. It should be understood the exemplary page marking geometries are non-limiting, and the page marking geometries can be any class of polygonal, ovoidal, or a combination of both polygonal and ovoidal geometries in nature.

In some embodiments, the geometric markings contain text or graphics providing information regarding the identified page. The text or graphic can protrude or depress from the surface of the geometric marking according to various embodiments (e.g., the text or graphic can be embossed to provide further tactile characteristics to the marking in addition to the three-dimensional nature of the marking itself, in some embodiments). The markings' locations, data, and presentations can serve multiple purposes and can be user defined or automated (e.g., the markings can be bookmarks, chapter markings, topic markings, markings related to social media trends, etc.). In some embodiments, only markings appearing in the remainder of the document appear in the tactile gradient. In alternative embodiments, all markings appear in the tactile gradient irrespective of the location of the presented page within the document. Collectively, the locations, geometries, and information contained within the markings can be stored within the document metadata (e.g., section titles) or within an alternative repository (e.g., a storage device operably coupled to the graphical display).

In some embodiments containing markings as described in FIG. 3, the marking geometries are an aspect of the tactile gradient, and thus, the markings are generated by a microfluidics panel distributing a selective volume. As a result, the creation of a marking can be associated with a regeneration of the tactile gradient in accordance with some embodiments of the present disclosure.

Figure 4:
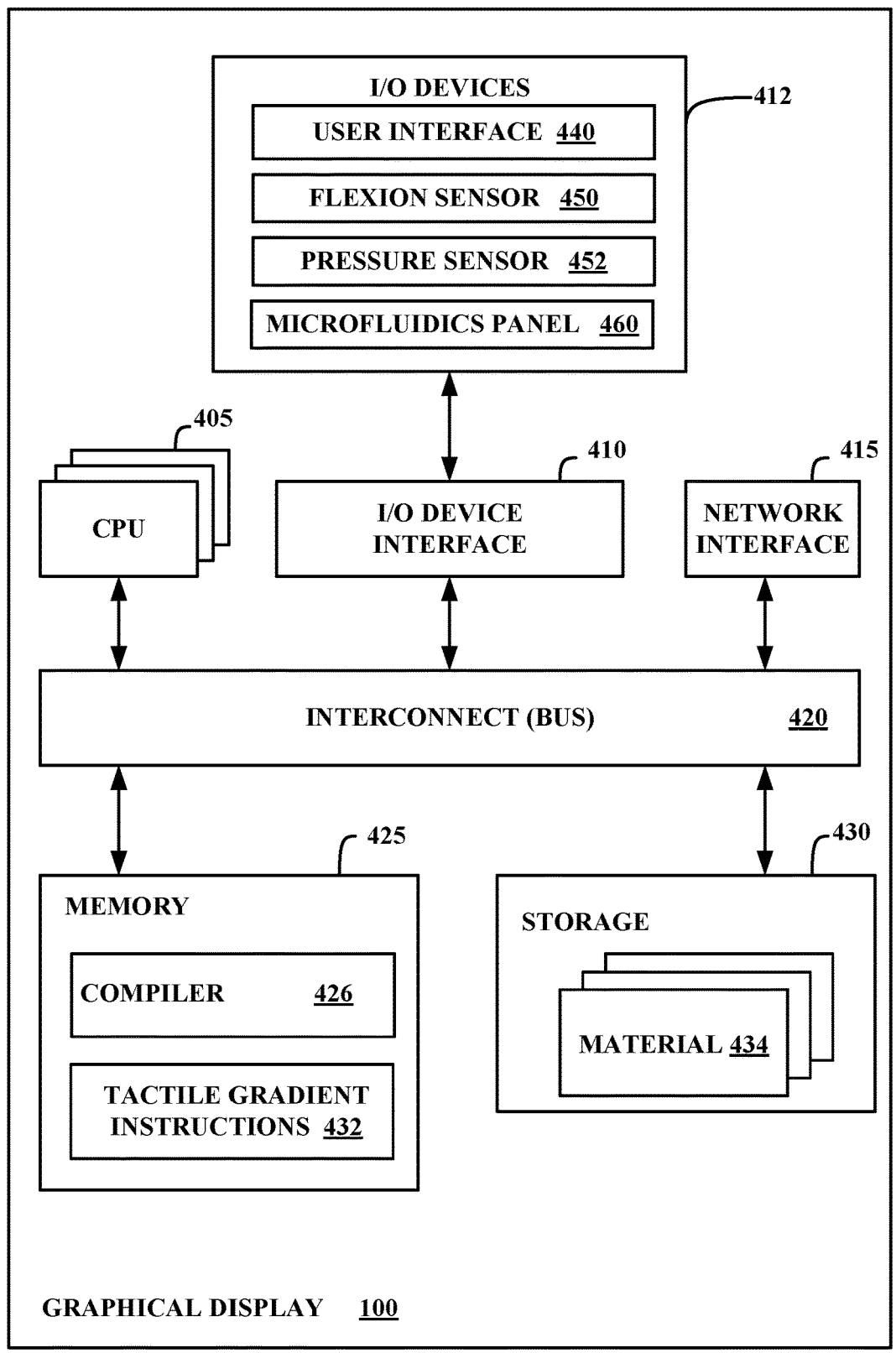
FIG. 4 presents a block diagram of a graphical display according to some embodiments of the present disclosure.

Referring now to FIG. 4, shown is a block diagram of a graphical display according to some embodiments of the present disclosure. In some embodiments the graphical display 100 is the same or substantially the same as the graphical display 100A and 100B of FIGS. 1A and 1B respectively. In various embodiments, the graphical display 100 includes a memory 425, storage 430, an interconnect (e.g., BUS) 420, one or more processors (e.g., CPUs) 405, an I/O device interface 410, I/O devices 412, and a network interface 415.

Each CPU 405 retrieves and executes programming instructions stored in the memory 425 or storage 430. The interconnect 420 is used to move data, such as programming instructions, between the CPU 405, I/O device interface 410, storage 430, network interface 415, and memory 425. The interconnect 420 can be implemented using one or more busses. The CPUs 405 can be a single CPU, multiple CPUs, or a single CPU having multiple processing cores in various embodiments. In some embodiments, a processor 405 can be a digital signal processor (DSP). Memory 425 is generally included to be representative of a random access memory (e.g., static random access memory (SRAM), dynamic random access memory (DRAM), or Flash). The storage 430 is generally included to be representative of a non-volatile memory, such as a hard disk drive, solid state device (SSD), removable memory cards, optical storage, or flash memory devices. In an alternative embodiment, the storage 430 can be replaced by storage area-network (SAN) devices, the cloud, or other devices connected to the graphical display 100 via the I/O devices 412 or a communication network via the network interface 415.

In some embodiments, the memory 425 stores a compiler 426 and tactile gradient instructions 432. The storage 430 stores the material 434. In some embodiments the material 434 is the same or substantially the same as the data 130 of FIG. 1 (i.e., a paginated document). In various embodiments the compiler 426, the tactile gradient instructions 432, and the material 434 are stored partially in memory 425 and partially in storage 430, or they are stored entirely in memory 425 or entirely in storage 430, or they are accessed over a network via the network interface 415.

According to various embodiments, the I/O devices 412 include a user interface 440, a flexion sensor 450, a pressure sensor 452, and a microfluidics panel 460. The user interface 440 presents the user with the material 434. The flexion sensor 450 monitors the flexion of the graphical display 100. In some embodiments, the flexion sensor 450 monitors the location of an axis of rotation of the flexion and the angle of the axis of rotation with respect to the presented material 434 or the graphical display 100. The pressure sensor 452 monitors the pressure across the tactile gradient. In various embodiments the information collected by flexion sensor 450 and pressure sensor 452 is temporarily stored in the memory 425 or the storage 430. Upon reaching various flexion and pressure thresholds (as described hereinafter with respect to FIG. 5, FIG. 6, and FIG. 7), the instructions 432 calculate the topography of the tactile gradient according to the information supplied by the flexion sensor 450 and the pressure sensor 452. The compiler 426 outputs a set of commands deployable by the CPU 405 according to the instructions 432. The CPU 405 executes the instructions and causes the microfluidics panel 460 to distribute a selective volume to generate the tactile gradient.

In various embodiments the user interface 440 and the microfluidics panel 460 are integrated with one another. In alternative embodiments, the user interface 440 and the microfluidics panel 460 form two distinct layers of the graphical display 100. In further embodiments still, the microfluidics panel 460 is smaller than the user interface 440 and is located in the portion of the graphical display 100 intended to display a tactile gradient. Regardless of the relationship between the user interface 440 and the microfluidics panel 460, both panels are operably connected to present both visual and tangible aspects of the tactile gradient.

The flexion sensor 450 and the pressure sensor 452 continuously, approximately continuously, or in predetermined time intervals collect information regarding the state of the user interface 440. Thus, as the flexion sensor 450 collects flexural information and the pressure sensor 452 collects pressure information, the CPU 405 calculates updated tactile gradient topographies based on the instructions 432. In cases where the new flexural state is sufficiently different from the previous flexural state, a new tactile gradient will be applied. In some embodiments, the sufficiency of difference is a function comprising a maximum permissible change in curvature, maximum permissible change in location of the axis of rotation, and maximum permissible change in orientation of the axis of rotation. In alternative embodiments, the sufficiency of difference is a function comprising a minimum pressure, a permissible location of the pressure, a maximum or minimum permissible translation of the pressure, and a permissible direction of the translation of the pressure. In cases where the second flexural state is sufficiently different from the first flexural state, the compiler 426, based on the instructions 432, outputs a set of commands deployable by a CPU 405 to alter the tactile gradient of the microfluidics panel 460.

Figure 5:
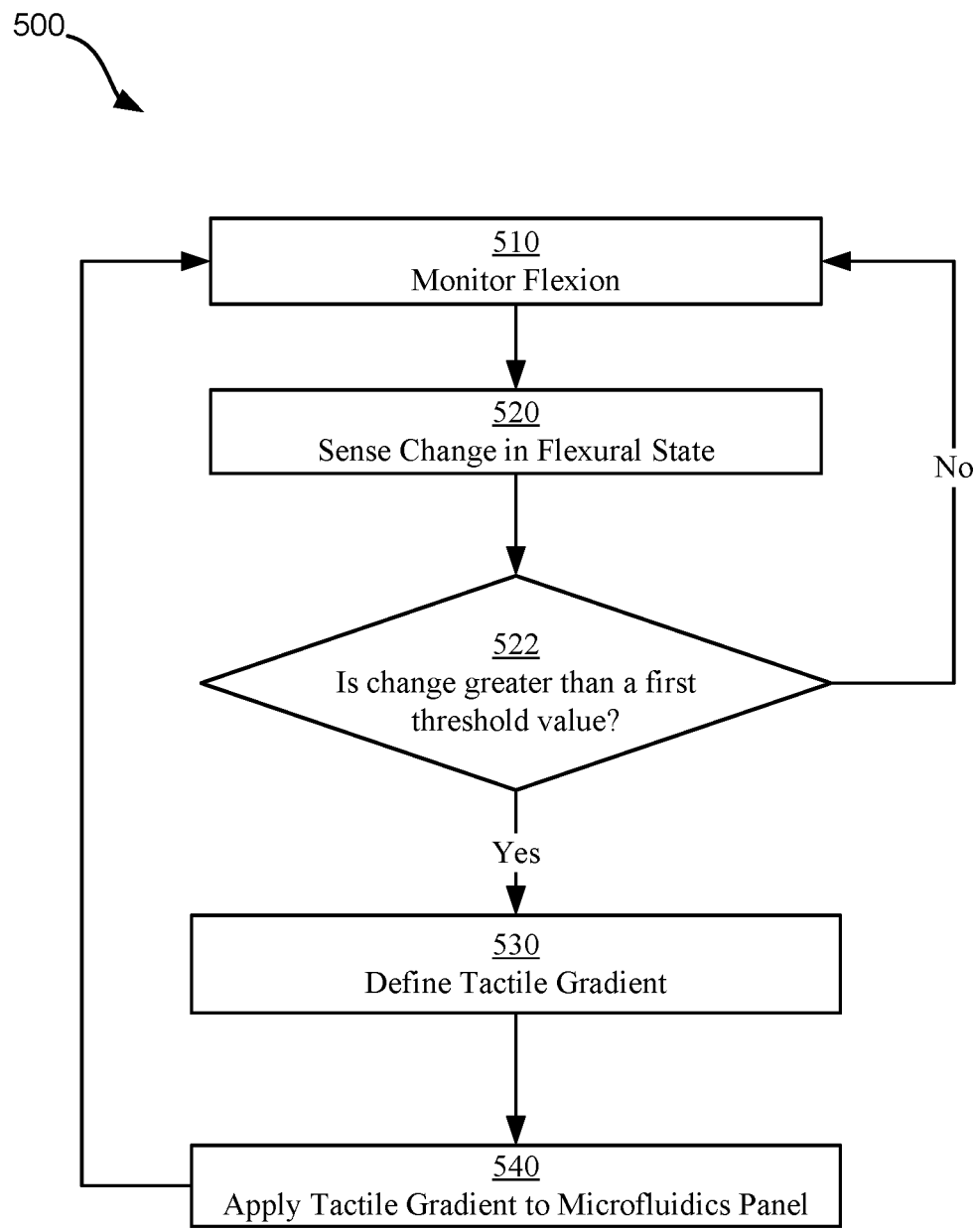
FIG. 5 presents a flowchart illustrating an example method of creating a tactile gradient according to some embodiments of the present disclosure.

Referring now to FIG. 5, shown is a flowchart illustrating an example method of creating a tactile gradient according to some embodiments of the present disclosure. In various embodiments the method 500 is executed by one or more CPUs 405 according to a set of instructions 432 as illustrated and described with respect to FIG. 4.

Method 500 starts with monitoring the flexion (operation 510) of the graphical display using, for example, the flexion sensor 450 of FIG. 4. In operation 520, a change in the flexural state of the graphical display is sensed. Specifically, a change from a first flexural state to a second flexural state is sensed. In operation 522, the magnitude of the change between the first flexural state and the second flexural state is compared to a first threshold. In various embodiments the first threshold is a function of the maximum permissible angle formed between axes of rotation of the first state and the second state, the maximum permissible distance between axes of rotation of the first state and the second state, and the maximum permissible difference in curvature of the first state and the second state. As used herein, the term "maximum" refers to a predetermined limit on a characteristic (e.g., angle, distance, etc.) which need not be the maximum value which is physically possible. Thus, in some embodiments, the maximum permissible characteristics comprising, for example, the first threshold, can be static or dynamic values. The first threshold can be a single number, a set of numbers, a percentage, or a set of percentages. If the first threshold is a number, it is compared to the difference between the initial flexural state and the second flexural state. If the number is a percentage, it is compared to the percentage change from the initial flexural state to the second flexural state. If the threshold is a set of numbers or percentages, each number or percentage can be compared to the threshold, or compared to a set of thresholds corresponding to various distances, angles, curvatures, or combinations thereof as previously described. Thus, the first threshold can control, in whole or in part, the level of granularity which causes the tactile gradient to be generated or regenerated.

If the change between the first flexural state and the second flexural state is below the first threshold, the method 500 reverts to operation 510 and continues monitoring the flexion of the graphical display 100. If the change is above the first threshold, the method proceeds to operation 530 to define a tactile gradient. In operation 530, the tactile gradient is defined to mimic characteristics of a book or other document. The characteristics defined by the tactile gradient can be, but are not limited to, the remaining pages in the document, all pages in the document, bookmarks, tags, and/or other markings. The tactile gradient defined in operation 530 can be determined by the instructions 432 of FIG. 4 in some embodiments. The updated tactile gradient is then applied to the graphical display (e.g., to the microfluidics panel 460 of FIG. 4) in operation 540. In some embodiments operation 540 is executed by one or more CPUs 405 of FIG. 4. Following application of the tactile gradient in operation 540, the method returns to monitoring the curvature in operation 510.

Figure 6:
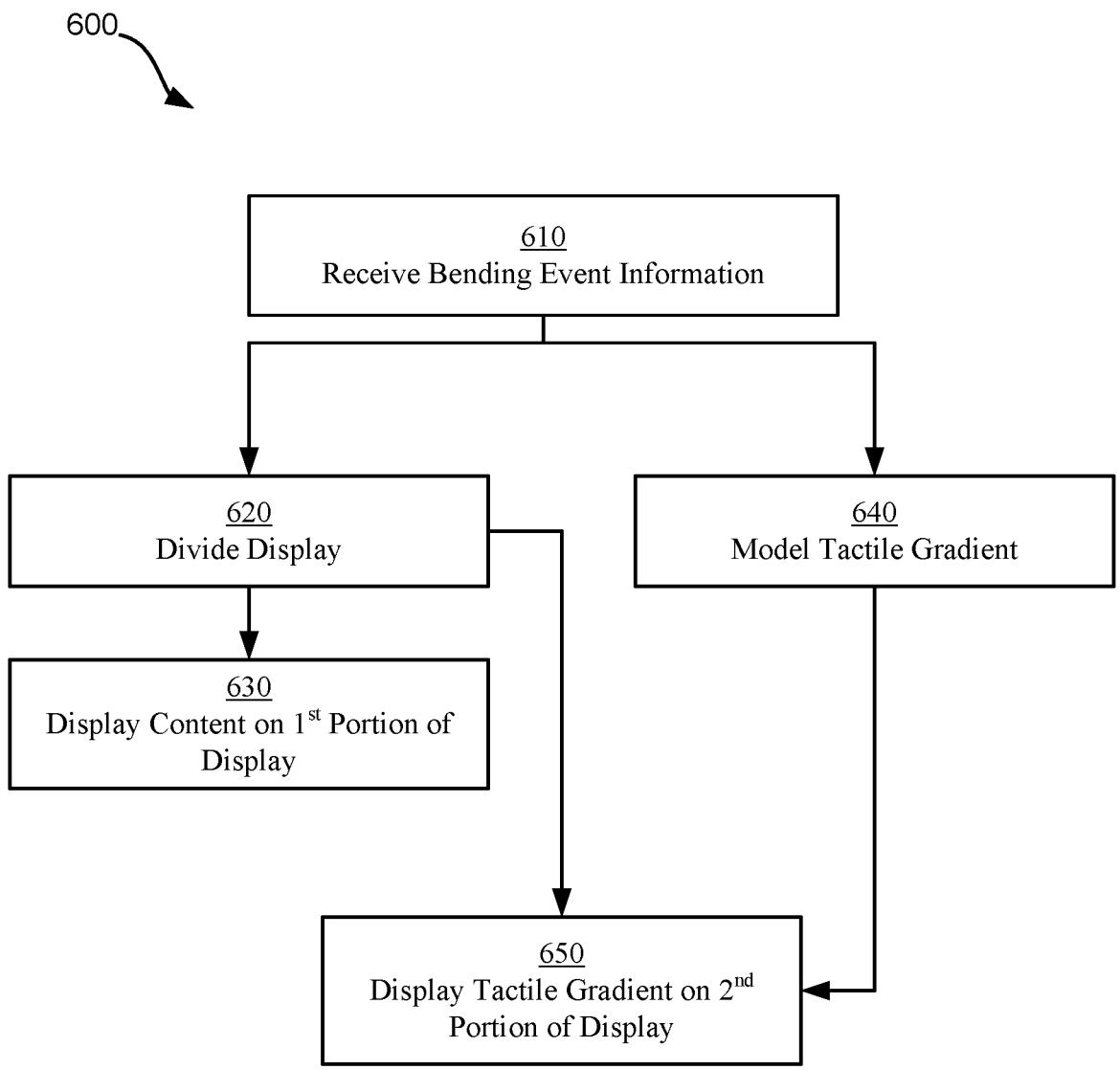
FIG. 6 presents a flowchart illustrating an example method of defining a tactile gradient according to some embodiments of the present disclosure.

Referring now to FIG. 6, shown is a flowchart illustrating an example method of defining a tactile gradient according to some embodiments of the present disclosure. In some embodiments, the method 600 is, in whole or in part, a subroutine executed in operation 530 of the method 500. The method 600 can start with operation 610 in which bending event information is received (e.g., the flexural state change detected in operation 520 and found to be above a first threshold in operation 522 of FIG. 5).

In operation 620, the display is divided into at least two portions. The two portions can be the same or different sizes. In some embodiments, the location and orientation of the division of the display is a function of the location of the bending event information received in operation 610. For example, in some embodiments, the division of the display is affected by any one, or any combination of, the location of the axis of rotation, the orientation of the axis of rotation, and/or the magnitude of the curvature. In various embodiments, the first portion of the divided display comprises, in whole or in part, the unflexed portion of the graphical display while the second portion of the divided graphical display comprises, in whole or in part, approximately the flexed portion of the graphical display.

In operation 630, the content displayed on the graphical display will be consolidated to a first portion of the divided display. In various embodiments the content is minimized (e.g., text minimized from size 10 to size 5), a smaller portion of the content is displayed (e.g., 100 words of text is restricted to 50 words of text), or a combination of both minimized content and restricted content is displayed as compared to the presentation of the content in the unflexed graphical display.

In operation 640 the tactile gradient is modelled. The tactile gradient is modelled to replicate the flexed profile of a document having the dimensions and pages of the document being presented. Thus, in various embodiments, operation 640 uses information such as the number of pages of the document, the location of the presented page, any markings (e.g., the markings shown and described with respect to FIG. 3), and bending event information such as the location of the axis of rotation, the orientation of the axis of rotation, and the magnitude of the curvature.

In operation 650, the tactile gradient modelled in operation 640 is applied to the second portion of the display. Thus, in various embodiments, the operation 650 involves distributing a selective volume contained within the graphical display to three-dimensionally produce the tactile gradient modelled in operation 640.

Figure 7:
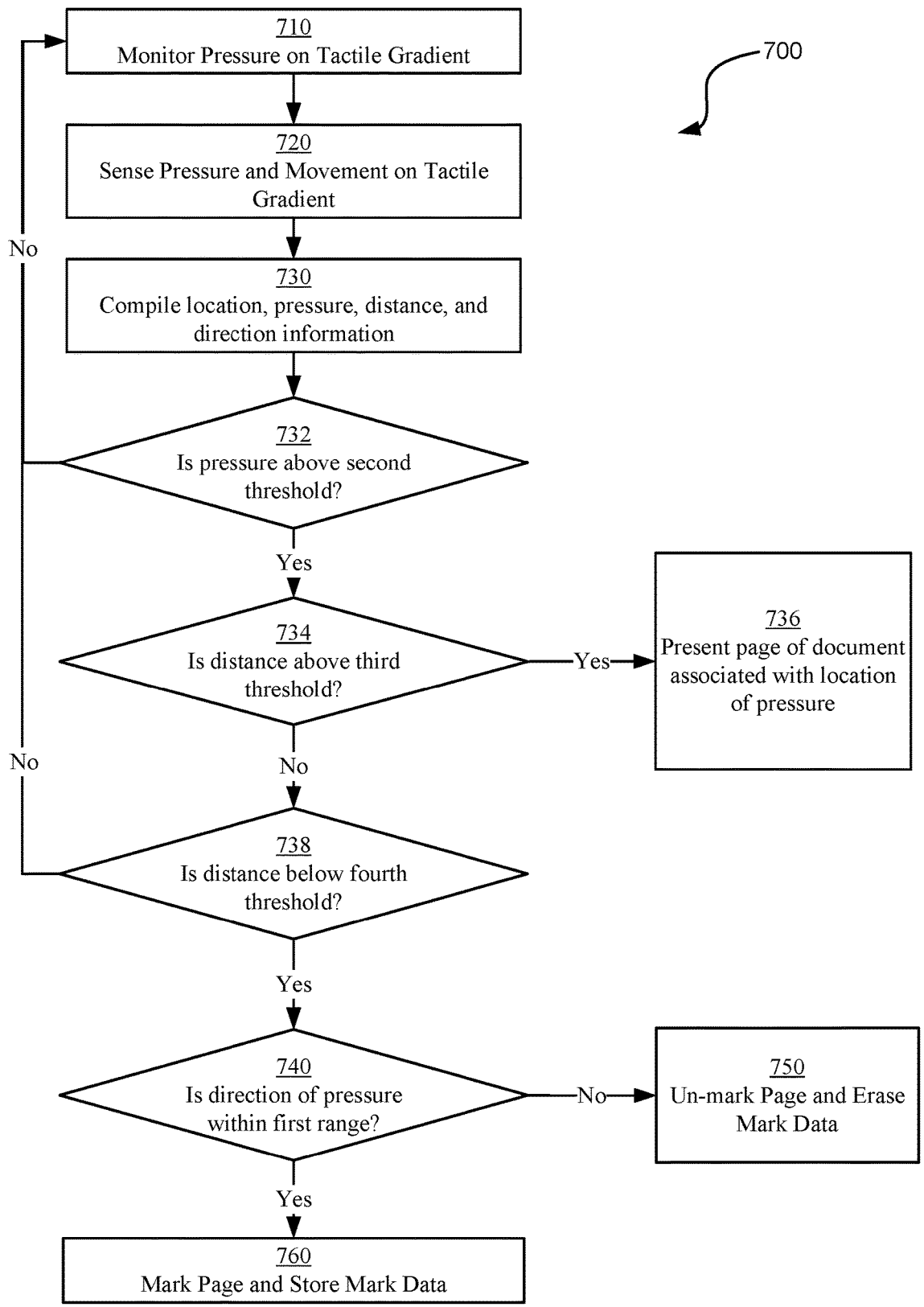
FIG. 7 presents a flowchart illustrating an example method of identifying and executing a user request according to some embodiments of the present disclosure.

Referring now to FIG. 7, shown is a flowchart illustrating an example method of identifying and executing a user request according to some embodiments of the present disclosure. In various embodiments the method 700 is executed by one or more CPUs 405 based on tactile gradient instructions 432 as shown and described in FIG. 4.

The method 700 begins with monitoring pressure on the tactile gradient in operation 710. In some embodiments the operation 710 is conducted by pressure sensor 452 of FIG. 4. In operation 720 a pressure associated with a movement is detected (e.g., dragging a finger on a portion of the graphical display). In operation 730 the magnitude of the pressure, the location of the initial pressure, the distance of the pressure movement, and the direction of the pressure movement are compiled.

In operation 732, the magnitude of the pressure is compared to the second threshold. The second threshold is a user defined pressure magnitude in some embodiments. In cases where operation 720 indicates the pressure is below the second threshold, operation 732 can return the method 700 to operation 710. Alternatively, in cases where the magnitude of the pressure sensed in operation 720 is above the second threshold, operation 732 can proceed to operation 734.

In operation 734 the distance of the pressure movement as calculated in operation 730 is compared to a third threshold. The third threshold is a user-defined distance magnitude in some embodiments. If the distance of the pressure movement is greater than the third threshold, the user interface will present the portion of the document associated with the location of the pressure in operation 736. The location of the pressure as calculated in operation 730 is associated with a location in the document (e.g., the material 434 of FIG. 4). In some embodiments, the location of the pressure is associated with a marking. In alternative embodiments the location of the pressure is associated with a number of pages (e.g., in a document containing 100 remaining pages, a pressure located at the midpoint of the tactile gradient could be associated with 50 pages). Thus, a sufficiently large pressure (per the second threshold) coupled with a sufficiently long movement (per the third threshold) results in the presentation of a selective portion of the data as a function of the location of the initial pressure.

In some embodiments, operation 736 can include a transition from the current page of the document to the selective page of the document. In such a case, the initial location of the pressure and the direction of the translation of the pressure can be used to generate an animation of the transition between the current page of the document and the selective page of the document associated with the location of the pressure. The transition can be two- or three-dimensional and can include an animated change in the tactile gradient representing the transition. In some embodiments, a raised geometry can move across the graphical display representing a moving page or set of pages.

Returning now to operation 734 of the method 700, in the event the distance of the pressure movement is below the third threshold, the method 700 can continue to operation 738. In operation 738 the distance of the pressure movement will be compared to a fourth threshold. The fourth threshold is an additional distance magnitude. In some embodiments the third threshold and the fourth threshold are the same distance magnitude, while in alternative embodiments the fourth threshold is less than the third threshold. If the distance is above the fourth threshold, the method 700 can return to operation 710. If the distance is below the fourth threshold, the method 700 can continue to operation 740.

In operation 740 the direction of the pressure movement is considered according to a first range. In some embodiments the first range is a range of acceptable directions of pressure with respect to a portion of the graphical display (e.g., with respect to the orientation of the presented data, or with respect to an edge of the graphical display). In cases where the direction of pressure is within the first range, operation 760 marks the presented page (e.g., marked as described with reference to FIG. 3) and stores the location of the marked page (e.g., in the storage 430 of FIG. 4). If the direction of pressure is not within the first range, then any data associated with the location of the pressure for the presented page will be un-marked and erased in operation 750. In various embodiments the operation 750 erases previous iterations of operation 760.

Thus, the method 700 provides numerous outcomes to various user actions. Specifically, operation 736 presents the user with selective portion of the data, operation 760 marks a portion of the data, and operation 750 erases a previously marked portion of the data. In some cases, the magnitude of the pressure, the location of the pressure, the distance of the pressure movement, and the direction of the pressure movement can be used to identify and execute the correct response.

It should be understood that although FIG. 7 presents a particular set of operations arranged in a particular order, numerous variations are contemplated. For example, operation 710 can occur in parallel with all other processes shown in FIG. 7 (i.e., pressure on the tactile gradient can be approximately continuously, or according to predetermined intervals, monitored throughout the method 700). In addition, various blocks shown in FIG. 7 can occur in alternative orders. For example, one operation can sense a pressure which can be followed by a determination of whether the pressure is above the second threshold. Subsequently, a movement associated with the pressure can be detected, the distance calculated, and the calculated distance compared to the third threshold. Thus, various blocks of FIG. 7 can be split into multiple blocks and various blocks can be rearranged with respect to one another. Additionally, embodiments of the present disclosure can use alternative measures. For example, although pressure, distance, and direction of pressure are stated, those variables can be represented in any number of ways, such as vectors, matrices, etc. Likewise, different data can be collected such as, but not limited to, replacing pressure with displacement, replacing distance with velocity, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   monitoring a flexural state of a graphical display presenting a current page of a document having a plurality of pages;
   determining a change from a first flexural state to a second flexural state of the graphical display is above a first threshold;
   defining, in response to determining the change from the first flexural state to the second flexural state is above a first threshold, a tactile gradient comprising a plurality of discrete surfaces representing at least a portion of the plurality of pages of the document, wherein a first surface of the plurality of discrete surfaces comprises a different geometry with respect to a second surface of the plurality of discrete surfaces, and wherein no two surfaces of the plurality of discrete surfaces are coplanar; and
   applying the tactile gradient to the graphical display by distributing a selective volume within a portion of the graphical display.

2. The method of claim 1, further comprising:
   sensing a pressure above a second threshold, the pressure being associated with a location of the pressure on the tactile gradient;
   sensing a translation of the pressure above a third threshold, the translation being associated with a direction of the translation; and
   transitioning from the current page to a selected page of the document based on the direction of the translation and the location of the pressure on the tactile gradient.

3. The method of claim 2, wherein the transitioning comprises a change to the tactile gradient, and wherein the method further comprises
   applying the change to the tactile gradient to the graphical display; and
   presenting the selected page of the document on the graphical display.

4. The method of claim 1, further comprising:
   sensing a pressure above a second threshold, the pressure being associated with a location of the pressure on the tactile gradient;
   sensing a translation of the pressure, the translation being below a fourth threshold;
   sensing a direction of the translation of the pressure, the direction being within a first range;
   re-defining the tactile gradient to produce an updated tactile gradient;
   applying the updated tactile gradient to the graphical display.

5. The method of claim 4, wherein the updated tactile gradient includes a marking, wherein the marking comprises a protrusion and a depression, the protrusion and the depression having a common edge, wherein the common edge forms a line of symmetry between the protrusion and the depression, wherein the protrusion and the depression are a function of the location of the pressure on the tactile gradient, the translation of the pressure, and the direction of the translation; and wherein the method further comprises:
associating the marking with the location of the pressure on the tactile gradient.

6. The method of claim 1, wherein defining the tactile gradient comprises defining the tactile gradient to produce a marking on at least one surface, wherein the marking is discrete from a surrounding surface, wherein the marking indicates a location of a selected page of the document.

7. The method of claim 6, wherein the marking has a geometry selected from a group consisting of: polygonal, and ovoidal.

8. The method of claim 1, wherein the first threshold is based on a maximum permissible angle formed between an axis of rotation of the first flexural state and an axis of rotation of the second flexural state, and a maximum permissible difference in a degree of a curvature of the first flexural state with respect to a degree of a curvature of the second flexural state.

9. The method of claim 1, wherein the graphical display comprises a microfluidics panel.

10. A computer program product comprising a computer readable storage medium having program instructions embodied therewith, the program instructions executable by a processor to cause the processor to perform a method comprising:
monitoring a flexural state of a graphical display presenting a current page of a document having a plurality of pages;
determining a change from a first flexural state to a second flexural state of the graphical display is above a first threshold;
defining, in response to determining the change from the first flexural state to the second flexural state is above a first threshold, a tactile gradient comprising a plurality of discrete surfaces representing at least a portion of the plurality of pages of the document, wherein a first surface of the plurality of discrete surfaces comprises a different geometry with respect to a second surface of the plurality of discrete surfaces, and wherein no two surfaces of the plurality of discrete surfaces are coplanar; and
applying the tactile gradient to the graphical display by distributing a selective volume within a portion of the graphical display.

11. The computer program product of claim 10, further comprising:
sensing a pressure above a second threshold, the pressure being associated with a location of the pressure on the tactile gradient;
sensing a translation of the pressure above a third threshold, the translation being associated with a direction of the translation; and
transitioning from the current page to a selected page of the document based on the direction of the translation and the location of the pressure on the tactile gradient.

12. The computer program product of claim 11, wherein the transitioning comprises a change to the tactile gradient, and wherein the method further comprises
applying the change to the tactile gradient to the graphical display; and
presenting the selected page of the document on the graphical display.

13. The computer program product of claim 10, further comprising:
sensing a pressure above a second threshold, the pressure being associated with a location of the pressure on the tactile gradient;
sensing a translation of the pressure, the translation being below a fourth threshold;
sensing a direction of the translation of the pressure, the direction being within a first range;
re-defining the tactile gradient to produce an updated tactile gradient;
applying the updated tactile gradient to the graphical display.

14. The computer program product of claim 13, wherein the updated tactile gradient includes a marking, wherein the marking comprises a protrusion and a depression, the protrusion and the depression having a common edge, wherein the common edge forms a line of symmetry between the protrusion and the depression, wherein the protrusion and the depression are a function of the location of the pressure on the tactile gradient, the translation of the pressure, and the direction of the translation; and
wherein the method further comprises:
associating the marking with the location of the pressure on the tactile gradient.

15. The computer program product of claim 10, wherein defining the tactile gradient comprises defining the tactile gradient to produce a marking on at least one surface, wherein the marking is discrete from a surrounding surface, wherein the marking indicates a location of a selected page of the document.

16. The computer program product of claim 15, wherein the marking has a geometry selected from a group consisting of: polygonal, and ovoidal.

17. The computer program product of claim 10, wherein the first threshold is based on a maximum permissible angle formed between an axis of rotation of the first flexural state and an axis of rotation of the second flexural state, and a maximum permissible difference in a degree of a curvature of the first flexural state with respect to a degree of a curvature of the second flexural state.

18. The computer program product of claim 10, wherein the graphical display comprises a microfluidics panel.

19. A system comprising:
a processor; and
a computer-readable storage medium storing program instructions which, when executed by the processor, are configured to cause the processor to perform a method comprising:
monitoring a flexural state of a graphical display presenting a current page of a document having a plurality of pages;
determining a change from a first flexural state to a second flexural state of the graphical display is above a first threshold;
defining, in response to determining the change from the first flexural state to the second flexural state is above a first threshold, a tactile gradient comprising a plurality of discrete surfaces representing at least a portion of the plurality of pages of the document, wherein a first surface of the plurality of discrete surfaces comprises a different geometry with respect to a second surface of the plurality of discrete surfaces, and wherein no two surfaces of the plurality of discrete surfaces are coplanar; and
applying the tactile gradient to the graphical display by distributing a selective volume within a portion of the graphical display.

20. The system of claim 19, the method further comprising:

sensing a pressure above a second threshold, the pressure being associated with a location of the pressure on the tactile gradient;

sensing a translation of the pressure above a third threshold, the translation being associated with a direction of the translation; and transitioning from the current page to a selected page of the document based on the direction of the translation and the location of the pressure on the tactile gradient.

* * * * *